Patented Nov. 2, 1926.

1,605,377

UNITED STATES PATENT OFFICE.

GUSTAV A. SCHULTHEISS, OF KANSAS CITY, KANSAS.

ANTIFREEZING MIXTURE.

Application filed September 25, 1925. Serial No. 58,619.

This invention relates to anti-freezing mixtures, and more particularly to an antifreezing mixture described and claimed in my copending application, Serial Number 12,191, filed February 28, 1925, of which the present application is a continuation in part.

It is well known that a calcium chloride solution is not only cheap but one of the best known solutions that may be used in radiators and in the cooling jackets of all types of internal combustion engines and which will not freeze except at extremely low temperatures so that if it were possible to use the calcium chloride without any injurious effects to the water jackets or radiators this solution could be employed in the coldest climate. However, the calcium chloride acts upon metals which are employed in the construction of such jackets and radiators, thereby causing leaks.

It is an object of the present invention to provide a solution containing calcium chloride in large proportions but in which ingredients are incorporated to prevent the action of the calcium chloride on the metals forming the jackets or radiators.

A further object of the invention is the provision of a cheap but practical solution of calcium chloride in which an oil has been incorporated in the solution so that the oil when placed in a refrigerating system or cooling system will form a thin film on the interior surfaces of said systems and prevent the calcium chloride from acting on the metals or in other words preventing the calcium chloride from coming in contact with the metals.

A further object of the invention is the provision of a solution containing an oil which may be readily mixed with large quantities of the calcium chloride solution and which will give up the oil when employed in a refrigerating or cooling system to form a thin film on the interior surfaces of the elements forming said systems.

This invention will be best understood from a consideration of the following detailed description; nevertheless it is to be understood that the invention is not confined to the disclosure, being susceptible of such changes and modifications which shall define no material departure from the salient features of the invention, as expressed in the appended claims.

The principle upon which this invention is based is the fact that when an animal oil or a vegetable oil or any of the compounds or derivatives of any of the oils are treated with an alcohol or a derivative of an alcohol capable of dissolving an oil, is thoroughly agitated with one of the oils, the alcohol dissolves such oil when the proper proportions of the alcohol and oil are intimately mixed. This solution of the alcohol and oil may be readily incorporated in a solution containing water since the alcohol acts as a vehicle for embodying the oil in such solution.

In carrying out my invention, I thoroughly mix an oil with an alcohol in the following approximate proportions, that is, for substantially one and one-half (1½) ounces of an oil, I use one (1) quart of an alcohol, and it must be borne in mind that by employing chemically pure oil and alcohol, that such proportions are adequate. The kind of oil to be employed and the particular type of alcohol will be explained later. When either the alcohol or the oil contains impurities, the proportions must be varied in order to increase the oil content of the alcohol. The oil and alcohol in the proportions named are thoroughly agitated in order that the oil will be properly incorporated in the alcohol, and this mixture is then allowed to stand from twenty-four to forty-eight hours in order to permit the alcohol to dissolve the oil. The length of time required for the solution to stand depends upon the atmospheric temperature and the kind of oil employed. In summer when the temperature is sufficiently high the period of twenty-four to forty-eight hours may be sufficient, but during the winter months, the time for completing the solution may require as much as from five to ten days, and where mineral oil is employed considerably more time is required to complete the solution than is required for the vegetable or animal oils or fats. The mineral oil requires approximately ten days for the alcohol to dissolve sufficient lubricating substances from the mineral oil so that it may be employed for the purpose. It may be necessary every twenty-four hours to agitate the solution during its period of standing in order to aid in the dissolving in the oil with the alcohol. Heat may be applied in order to advance the solution. The density of the oil employed will regulate the proportions of the oil and alcohol.

To approximately one part of the solution of oil and alcohol is added four parts of a solution of calcium chloride dissolved in water, or a solution of calcium chloride registering between thirty and thirty-five degrees Bé., and the whole is thoroughly agitated. The proportions of the solution of alcohol and oil and the solution of the calcium chloride may be varied in order to conform to local conditions of temperature and therefore the proportions named above are merely approximations and are not essential to the successful use of the anti-freezing liquid. The final solution is brought to the boiling point of the alcohol and then allowed to cool. This step purifies the product for especial use in cooling systems in internal combustion engines. It is not essential at all times to boil the final solution to cause the solution to apply a film of oil to the metal parts.

The oil which may experience shows is the most efficient for the purpose is clear cold pressed castor-oil which is miscible with an alcohol, particularly ethyl-alcohol. Many other oils are soluble in alcohol to an appreciable degree, and the process could be effectively carried out with such oil using a larger volume of alcohol as a vehicle for the oil when used in connection with the anti-freezing solution.

While I preferably use castor-oil, it must be borne in mind that other oils and fats may be employed for the purpose, and while other oils and fats dissolve very sparingly in cold alcohol, boiling alcohol, however, dissolves somewhat larger quantities particularly those oils and fats which contain glycerides of the free fatty acids. The solubility of the oils and fats is considerably increased by the presence of free fatty acids, and if the amount of the free fatty acids in the latter exceed about 30% even cold alcohol will readily dissolve the oils and fats.

Unsaturated oils which may be employed for the purposes set forth are linseed oil, hemp oil, poppy seed oil, sunflower oil, maize oil, cottonseed oil, almond oil, peanut oil, olive oil, laurel oil, palm oil, cocoa butter, cocoanut oil, beef tallow and butter fat and any other such oils which will readily take up a halogen without the substitution of hydrogen atoms.

Any of the above fats or oils or their halogen derivatives when treated with hot alcohol will go into solution to a definite degree and when added to a calcium chloride solution some fatty acids will be produced and which will thus aid in the solvent properties of the dilute solution and hold sufficient oil or fat in the solution to provide a sufficient protective action when the oil has formed a thin film on the metal walls of the receptacles in which the solution is used.

Oils and fats which are glyceryl esters of the organic acids, may be dissolved in cold alcohol by the addition of free fatty acids and a considerable quantity of oil or fat held in solution. Upon the addition of this solution to the solution of calcium chloride, a considerable volume of the fats and oils will be held in solution temporarily, but upon removal of the alcohol by heat or evaporation, the oils will form a film upon the walls of the radiator, the engine jacket or other receptacle. This film will act as a protective coating against the corrosive action of the salt solution employed as the cooling medium.

In the use of mineral oils those oils which are ordinarily employed for lubricating purposes and are the result of the distillation of petroleum may be employed for the purpose, but greater time is required for the process than is necessary when using the animal or vegetable fats or oils, and as has been stated approximately ten days is required, with daily agitation of the oil and alcohol. The result is that the alcohol will dissolve a sufficient quantity of lubricating material from the oil, which, when used in conjunction with the calcium chloride solution, will provide a coating on the surfaces of the container in which the anti-freezing mixture is employed.

The alcohol being very volatile will spread an extremely thin film of oil or fats over a considerable surface so that only a small quantity of the oil or fat is necessary in proportion to the quantity of alcohol that may be used.

Instead of dissolving the oil in the alcohol to form the first solution, the oil, or a halogen or an amino or nitro derivative of the oil may be treated with a primary, secondary or tertiary alcohol. This mixture is agitated until all the oil is dissolved and since the alcohol is miscible with water the calcium chloride solution may be intimately mixed with the solution, and the solution will carry the oil for forming a film on the interior walls of refrigerating and cooling systems to protect the metal walls from corrosion by the acid salt of calcium.

Another method of forming my product consists in treating the oil with ammonia solutions and then adding the calcium chloride solution. This solution is then boiled to remove excess ammonia and then titrated to a neutral reaction by the use of dilute hydrochloric acid, standard indicators being employed for the determination, as is well known.

This anti-freezing solution provides a solution for protecting metals from chemical solutions, so that when the solution is placed in a container or receptacle or refrigerating plant and chilled, the fats or oils in the alcoholic solution will become disassociated from the alcohol and be deposited upon the metal container in a thin film.

What I claim is:

1. An anti-freezing solution comprising an oil dissolved in an alcohol and a solution of calcium chloride.

2. An anti-freezing solution comprising castor-oil dissolved in an alcohol and a solution of calcium chloride.

3. An anti-freezing solution comprising a solution of calcium chloride and an ingredient in solution with the calcium chloride to form a protective coating for metal against the action of the calcium chloride, said ingredient being adapted to be released from the solution when said solution comes into contact with the metal for coating the metal.

4. An anti-freezing solution comprising an oil, a solvent for said oil, and a solution of calcium chloride, the solvent being of such a type that it will release the oil from the solution when the solution comes in contact with the metal whereby the metal will be coated with the oil.

5. An anti-freezing solution comprising castor-oil, a solvent for said oil, and a solution of calcium chloride.

6. An anti-freezing solution comprising a solution of calcium chloride, an ingredient insoluble in water to form a protective coating for metals against the action of the calcium chloride, and an ingredient for dissolving the insoluble ingredient whereby the insoluble ingredient may be incorporated in the calcium chloride solution, said insoluble ingredient being released from the dissolving ingredient when the solution comes into contact with a metal whereby the metal will be coated by the insoluble ingredient to protect the metal from the action of the calcium chloride.

7. An anti-freezing solution comprising ingredients in the following proportions, 1½ ounces of an oil dissolved in 1 quart of an alcohol to which is added 4 quarts of a solution of calcium chloride.

8. An anti-freezing solution comprising ingredients in the following proportions, 1½ ounces of castor-oil, one quart of an alcohol and 4 quarts of a solution of calcium chloride.

9. A process for forming an anti-freezing mixture comprising agitating an oil and an alcohol, letting the mixture stand until the oil is dissolved, then adding a solution of calcium chloride.

10. A process for forming an anti-freezing mixture comprising agitating castor oil and ethyl-alcohol, letting the mixture stand until the oil is dissolved, and adding a solution of calcium chloride.

11. A process for forming an anti-freezing mixture comprising agitating an oil and an alcohol, letting the mixture stand until the oil is dissolved, adding additional alcohol to dissolve any excess oil, then adding a solution of calcium chloride.

12. An anti-freezing solution comprising a boiled solution of an oil dissolved in an alcohol, and calcium chloride.

13. An anti-freezing solution comprising a boiled solution of castor oil dissolved in an alcohol, and a solution of calcium chloride.

14. A process for forming an anti-freezing mixture comprising agitating an oil and an alcohol, letting the mixture stand until the oil is dissolved, adding additional alcohol to dissolve any excess oil, adding a solution of calcium chloride, and then boiling the solution thus formed.

15. A process for forming an anti-freezing mixture comprising agitating an oil and an alcohol, letting the mixture stand until the oil is dissolved, adding additional alcohol to dissolve any excess oil, adding a solution of calcium chloride, agitating the solution thus formed, and then boiling the final agitated solution.

16. A process for forming an anti-freezing mixture comprising agitating castor oil in an ethyl-alcohol, letting the mixture stand until the oil is dissolved, adding additional alcohol to dissolve any excess oil, adding a solution of calcium chloride, agitating the solution thus formed and then boiling the final agitated solution.

17. A process for forming an anti-freezing mixture comprising dissolving 1½ ounces of castor oil in 1 quart of alcohol and then adding four quarts of a solution of calcium chloride, registering approximately 30° Baumé

18. A process for forming an anti-freezing mixture which comprises treating a fat or oil with hot alcohol for partially dissolving the fats or oils in said alcohol, adding said solution to a solution of calcium chloride whereby the fatty acids are produced for aiding in causing the fats or oils to dissolve in the dilute solution of calcium chloride.

GUSTAV A. SCHULTHEISS.